United States Patent
Tonino et al.

(10) Patent No.: US 11,837,933 B2
(45) Date of Patent: Dec. 5, 2023

(54) PROCESS FOR MAKING AN ELECTRIC CONDUCTOR FOR A WINDING OF AN ELECTRIC MACHINE, ELECTRIC CONDUCTOR MADE WITH SUCH PROCESS AND ELECTRIC MACHINE COMPRISING A WINDING MADE WITH SUCH ELECTRIC CONDUCTOR

(71) Applicant: MAVEL EDT S.P.A., Pont-Saint-Martin (IT)

(72) Inventors: Andrea Tonino, Pont-Saint-Martin AO (IT); Luca Favre, Pont-Saint-Martin AO (IT)

(73) Assignee: MAVEL EDT S.P.A, Point-Saint-Martin (IT)

(*) Notice: Subject to any disclaimer, the term of this patent is extended or adjusted under 35 U.S.C. 154(b) by 0 days.

(21) Appl. No.: 17/784,780

(22) PCT Filed: Dec. 31, 2019

(86) PCT No.: PCT/IT2019/000123
§ 371 (c)(1),
(2) Date: Jun. 13, 2022

(87) PCT Pub. No.: WO2021/137260
PCT Pub. Date: Jul. 8, 2021

(65) Prior Publication Data
US 2023/0008528 A1    Jan. 12, 2023

(51) Int. Cl.
*H02K 3/42* (2006.01)
*H02K 3/34* (2006.01)
(Continued)

(52) U.S. Cl.
CPC .............. *H02K 3/42* (2013.01); *H02K 3/34* (2013.01); *H02K 15/105* (2013.01); *H02K 15/12* (2013.01)

(58) Field of Classification Search
CPC .......... H02K 3/34; H02K 3/42; H02K 15/105; H02K 15/12
(Continued)

(56) References Cited

U.S. PATENT DOCUMENTS 4,883,981 A * 11/1989 Gerfast ................ H02K 3/47
310/46
4,969,260 A * 11/1990 Kondo ................ H01R 4/20
29/877

(Continued)

FOREIGN PATENT DOCUMENTS

| CN | 103840589 A | 6/2014 |
| EP | 2639939 A1 | 9/2013 |
| JP | 2009199749 A | 9/2009 |

OTHER PUBLICATIONS

Yamada et al., English Machine Translation of JP 2009-199749 (Year: 2009).*
(Continued)

*Primary Examiner* — Rashad H Johnson
(74) *Attorney, Agent, or Firm* — Amster Rothstein & Ebenstein

(57) ABSTRACT

A process is described, for making an electric conductor for a winding of an electric machine comprising the following steps: providing an external shell (20} with a tubular shape made of electrically conducting material; inserting at least two wires (215 made of electrically conducting material in the external shell (20); heating the external shell (20) and the wires (21) inserted therein; laminating wherein the external shell (205 and the wires (215 are formed to modify the profile of their cross section; optionally repeating at least one of the two previous steps; an electric conductor made with such process and an electric machine comprising a winding made with such electric conductor are further described.

11 Claims, 1 Drawing Sheet

Figure 1:
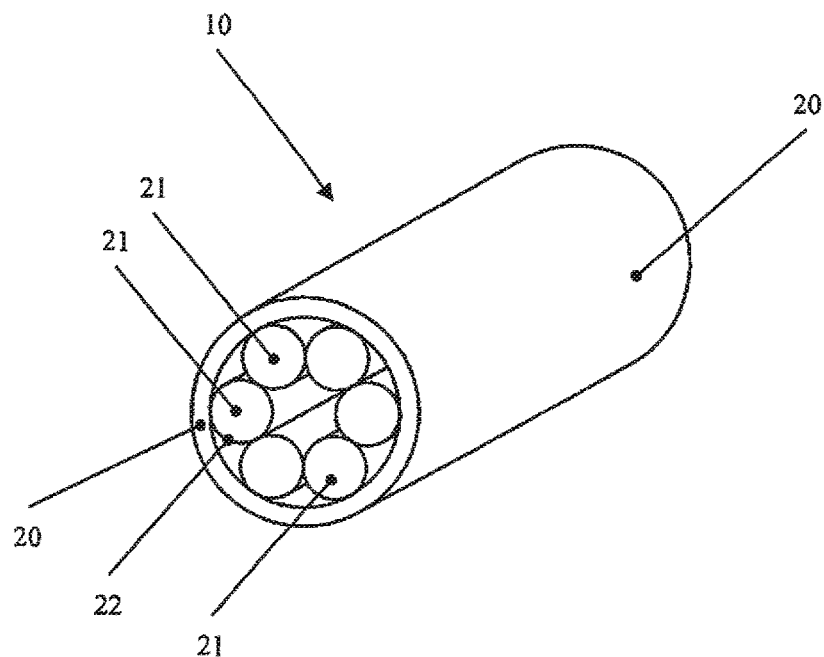

(51) Int. Cl.
*H02K 15/10* (2006.01)
*H02K 15/12* (2006.01)

(58) Field of Classification Search
USPC .......................................................... 310/213
See application file for complete search history.

(56) References Cited

U.S. PATENT DOCUMENTS

| | | | | |
|---|---|---|---|---|
| 5,149,917 | A * | 9/1992 | Sawada | B60R 16/0215 |
| | | | | 174/133 R |
| 9,508,466 | B2 * | 11/2016 | Kondo | H01B 7/0045 |
| 2010/0300725 | A1 * | 12/2010 | Nakayama | H01B 3/441 |
| | | | | 174/110 SR |
| 2011/0036614 | A1 * | 2/2011 | Otsuka | C22C 21/00 |
| | | | | 156/50 |
| 2011/0140539 | A1 * | 6/2011 | Yamamoto | B60L 53/12 |
| | | | | 307/104 |
| 2014/0008097 | A1 * | 1/2014 | Sugie | H01B 7/303 |
| | | | | 174/102 R |
| 2014/0015347 | A1 * | 1/2014 | Marvin | H02K 9/227 |
| | | | | 310/43 |
| 2014/0015351 | A1 * | 1/2014 | Marvin | H02K 9/16 |
| | | | | 310/54 |
| 2014/0015352 | A1 * | 1/2014 | Marvin | H02K 15/045 |
| | | | | 310/198 |
| 2014/0015353 | A1 * | 1/2014 | Marvin | H02K 3/28 |
| | | | | 29/596 |
| 2014/0069686 | A1 * | 3/2014 | Abe | H01B 7/0275 |
| | | | | 521/88 |
| 2018/0301244 | A1 * | 10/2018 | Calebrese | H02K 3/40 |
| 2018/0323672 | A1 * | 11/2018 | Juris | H02K 3/18 |
| 2019/0207439 | A1 * | 7/2019 | Marino | H02K 1/20 |
| 2022/0231561 | A1 * | 7/2022 | Lin | H02K 3/04 |
| 2022/0271596 | A1 * | 8/2022 | Takahashi | H02K 3/522 |
| 2022/0271633 | A1 * | 8/2022 | Takahashi | H02K 15/095 |
| 2022/0286007 | A1 * | 9/2022 | Takahashi | H02K 1/27 |
| 2022/0360150 | A1 * | 11/2022 | Witwer | H02K 15/0478 |
| 2022/0368189 | A1 * | 11/2022 | Takahashi | H02K 3/522 |
| 2022/0399786 | A1 * | 12/2022 | Graef | H02K 9/197 |
| 2023/0008528 | A1 * | 1/2023 | Tonino | H02K 15/105 |
| 2023/0112188 | A1 * | 4/2023 | Sawata | H02K 3/24 |
| | | | | 310/65 |

OTHER PUBLICATIONS

International Search Report and Written Opinion issued in PCT/IT2019/000123 dated Sep. 23, 2020.

* cited by examiner

PROCESS FOR MAKING AN ELECTRIC CONDUCTOR FOR A WINDING OF AN ELECTRIC MACHINE, ELECTRIC CONDUCTOR MADE WITH SUCH PROCESS AND ELECTRIC MACHINE COMPRISING A WINDING MADE WITH SUCH ELECTRIC CONDUCTOR

CROSS-REFERENCE TO RELATED APPLICATIONS

This application is a U.S. national stage entry under 35 U.S.C. § 371 of PCT International Patent Application No. PCT/IT2019/000123, filed Dec. 31, 2019, the contents of which are incorporated herein by reference in their entirety.

The present invention refers to a process for making an electric conductor for a winding of an electric machine, in particular for a stator of an electric machine, and to an electric conductor made with such process.

In particular, the invention refers to an electric conductor usable to make, through bending, coil elements shaped as a "hairpin", to be inserted into the recesses of the stator of an electric machine to make an electric winding adapted to generate a magnetic field, which rotates the rotor.

Shape and bending angle of the coil elements shaped as a hairpin change upon changing the geometry of the stator and of the recesses, and upon changing the winding scheme.

These known coil elements shaped as a hairpin are inserted in the stator recesses on the same side, with the two ends of every hairpin inserted in different recesses, according to a certain scheme, to obtain the exact number of coils necessary to compose the desired winding; the ends of the strips projecting from the recesses are bent with a twisting process, to prevent them from coming out, and are then mutually welded, after having removed the insulation from the welding area, in order to create a correct connection between the different copper hairpins to shape the stator winding.

It is further possible to make hairpins starting from an electric conductor having a wide cross section, till a cross section is obtained, equal to the recess section, to optimize the recess filling.

These windings made with conductors, in particular hairpins, having a wide cross section, have the problem of causing high leakages due to eddy currents.

Documents EP-A1-2639939 and US-A-2014/0191610 disclose an electric conductor for a motor comprising an assembly of thin braided wires, which include a conductor and an insulating coating, and a metallic coating element which covers an external surface of the assembly of thin braided wires.

These known electric conductors have the problem that, when they are bent to make a coil element shaped as a hairpin, the thin braided wires at the ends of the coil element separate and make it difficult to mutually weld the elements, to make the motor windings.

Object of the present invention is solving the above problems through a process for making an electric conductor for a winding of an electric machine and an electric conductor made with such process, which allow making a winding with coil elements of the hairpin type, which have a wide cross section, in order to optimize the filling of the recess of a stator of an electric machine, and allow at the same time to reduce the leakages due to eddy currents in the winding.

The above and other objects and advantages of the invention, as will result from the following description, are obtained with a process for making an electric conductor for a winding of an electric machine, an electric conductor made with such process, a stator and an electric machine comprising a winding made with such electric conductor as claimed in the independent claims.

Preferred embodiments and non-trivial variations of the present invention are the subject matter of the dependent claims.

It is intended that all enclosed claims are an integral part of the present description.

It will be immediately obvious that numerous variations and modifications (for example related to shape, sizes, arrangements and parts with equivalent functionality) can be made to what is described, without departing from the scope of the invention, as appears from the enclosed claims.

Figure 2:
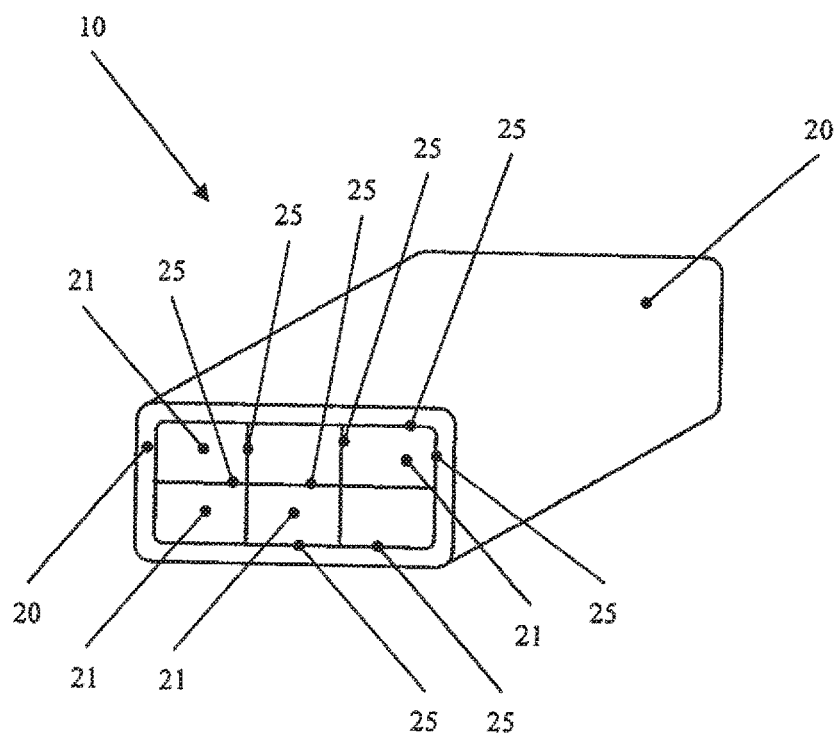

The present invention will be better described by some preferred embodiments thereof, provided as a non-limiting example, with reference to the enclosed drawings, in which:

FIG. 1 shows a perspective view of an electric conductor for a winding of an electric machine in a starting step of the process according to the invention; and FIG. 2 shows a perspective view of an electric conductor for a winding of an electric machine made with the process according to the invention.

With reference to the Figures, the process for making an electric conductor 10 for a winding of an electric machine according to the invention comprises the following steps:

a step of providing an external shell 20 of the electric conductor with a tubular shape, preferably made in a single piece in electrically conducting material, for example a metal such as copper or aluminium;

a step of inserting in the external shell 20 at least two wires 21, preferably a plurality of wires 21, made of an electrically conducting material, for example a metal; in an embodiment of the electric conductor 10 of the invention, the wires 21 are coated with an electrically insulating material 22, preferably a layer of enamel of a known type or an oxide; the wires 21 can be inserted in the external tubular shell 20 mutually parallel or braided;

a step of heating, preferably through known heating means, the external shell 20 and the wires inserted therein, at a temperature included between 180° C. and 800° C., preferably between 500° C. and 600° C.;

a step of laminating the external shell 20 with the wires 21 inserted therein, performed with a mill for working special profiles, for example comprising four rollers or cylinders opposed two by two, in which the sizes of the cross sections of the external shell 20 and of the wires 21 inserted therein are reduced, and the external shell 20 and the wires 21, and therefore the electric conductor 10, are formed to modify the profile of their cross section;

an optional step of repeating at least one of the two previous steps of heating and/or of laminating.

At the end of the process, the electric conductor 10 of the invention is obtained, which comprises: the external shell 20, preferably made of a single piece in electrically conducting material, fastened with at least two wires 21, preferably a plurality of wires 21, inserted therein which in turn are mutually fastened, and an electrically insulating layer 25, having a higher resistivity than that of the material composing the wires 21 and/or the external shell 20; said electrically insulating layer 25 is included between the wires 21, and between the wires 21 themselves and the internal surface 24 of the external shell 20, and is shaped by the residues of the electrically insulating material 22 which coated the surface of the single wire 21 at the beginning of the process, and/or by a layer comprising material, for example oxidized material, which is formed during the process of the invention; in a preferred way, at the end of the process according to the invention, the profile of the cross section of the external shell 20, or of the electric conductor 10, and the profile of the cross section of the wires 21 inserted therein, are shaped with similar shapes, for example a parallelogram, or a shape substantially equal to that of the recess of the stator of the electric machine inside which the electric conductor 10 will be inserted to make the winding.

Preferably, the profile of the cross section of the wires 21 is equal to the profile of the cross section of the external shell 20, for example a rectangular or trapezoidal shape, and can be shaped in order to have a shape equal to that of the section of a recess of a stator of an electric machine, inside which it will be inserted to form a winding with coil elements of the hairpin type, which have a wide cross section, in order to optimize the filling of the recess.

Advantageously, the electric conductor 10 of the invention, which comprises the mutually fastened wires 21 and the external shell 20 and the electrically insulating layer 25 included between them, allow reducing the leakages due to eddy currents in the stator winding.

Advantageously, the process of the invention allows making an electric conductor to form a winding of a stator with coil elements of the hairpin type, which allows optimizing the filling of the recess and reducing the leakages due to eddy currents, to keep a high efficiency of the electric machine.

The invention claimed is:

1. Process for making an electric conductor for a winding of an electric machine comprising the following steps:
    a step of providing an external shell (20) with a tubular shape made of electrically conducting material;
    a step of inserting in the external shell (20) at least two wires (21) made of electrically conducting material;
    a step of heating the external shell (20) and the wires (21) inserted therein, the step of heating the external shell (20) and the wires (21) inserted therein performed at a temperature included between 500° C. and 600° C.;
    a step of laminating the external shell (20) with the wires (21) inserted therein, wherein the external shell (20) and the wires (21) are formed to modify the profile of their cross section;
    an optional step of repeating at least one of the two previous steps.

2. Process for making an electric conductor for a winding of an electric machine according to claim 1, characterized in that, in the step of inserting the wires (21), a plurality of mutually parallel or braided wires (21) are inserted in the external tubular shell (20).

3. Process for making an electric conductor for a winding of an electric machine according to claim 1, characterized in that the external tubular shell (20) is made in a single piece.

4. Process for making an electric conductor for a winding of an electric machine according to claim 1, characterized in that the wires (21), before being inserted in the external shell (20) in the step of inserting, are coated with an electrically insulating material (22).

5. Process for making an electric conductor for a winding of an electric machine according to claim 1, characterized in that the step of laminating the external shell (20) with the wires (21) inserted therein is performed with a mill for working special profiles comprising four rollers or cylinders opposed two by two.

6. Electric conductor (10) for a winding of an electric machine comprising: an external shell (20) with a tubular shape fastened with at least two wires (21) inserted therein, which in turn are mutually fastened, and an electrically insulating layer (25) included between the wires (21), and between the wires (21) themselves and the internal surface (24) of the external shell (20), said external shell (20) and said wires (21) being made of electrically conducting material, said electrically insulating layer (25) being shaped by the residues of the electrically insulating material (22) which coated the surface of the single wire (21) at the beginning of the process according to claim 1, and/or by a layer comprising material which is formed during the process according to claim 1.

7. Electric conductor (10) for a winding of an electric machine according to claim 6, characterized in that it comprises a plurality of wires (21).

8. Electric conductor (10) for a winding of an electric machine according to claim 7, characterized in that the profile of the cross section of the external shell (20) and the profile of the cross section of the wires (21) inserted therein are shaped with similar shapes.

9. Electric conductor (10) for a winding of an electric machine according to claim 6, characterized in that the external shell (20) with a tubular shape is made in a single piece.

10. Electric conductor (10) for a winding of an electric machine according to claim 6, characterized in that the profile of the cross section of the external shell (20) and the profile of the cross section of the wires (21) inserted therein have a shape substantially equal to that of a recess of a stator of the electric machine inside which the electric conductor (10) will be inserted to make the winding.

11. Electric machine comprising a stator with a winding made with an electric conductor (10) according to claim 6.

* * * * *